Aug. 5, 1958 A. S. KARPER 2,845,730

STREAMLINE ROTARY INDEX

Filed Sept. 14, 1956 3 Sheets-Sheet 1

INVENTOR.

Abraham Singer Karper

BY Irving Seidman

ATTORNEY

INVENTOR.
Abraham Singer Karper
BY Irving Seidman
ATTORNEY

Aug. 5, 1958 A. S. KARPER 2,845,730

STREAMLINE ROTARY INDEX

Filed Sept. 14, 1956 3 Sheets-Sheet 3

INVENTOR.
Abraham Singer Karper
BY Irving Seidman
ATTORNEY

United States Patent Office 2,845,730

Patented Aug. 5, 1958

2,845,730

STREAMLINE ROTARY INDEX

Abraham Singer Karper, Riverdale, N. Y.

Application September 14, 1956, Serial No. 609,971

3 Claims. (Cl. 40—104)

This invention relates to indexed files or memorandum devices of the type containing a stack of memorandum or file cards selectively exposed, in accordance with the position of an indexing or selector member, when the device is opened. More particularly, the invention is directed to an improved and constructionally simplified device of this type including novel rotatable card pickup means and novel indexing means therefor.

In accordance with the invention, an indexed memorandum device is provided in the form of a streamline base and cover assembly conjointly enclosing a stack of memorandum or file cards, the cover being hinged to the base and spring biased to the open position when a releasable latch or catch is operated. The memorandum cards have opposed concentric arcuate peripheral portions each having a notch therein, the two notches of each card being located in relatively corresponding positions. The notches of adjacent cards are progressively stepped along the peripheral portions for selective regulation of the number of cards lifted by a rotatable pickup device when the cover is opened.

The pickup means is rotatable or oscillatable about the axis of the arcuate peripheral portions of the cards, and includes a pair of radial arms having hooked outer ends engageable with the card peripheries except where the latter are notched. The pickup means is rotatable by suitable means, such as a ring or disk oscillatable on the cover and cooperable with suitable index means. Alternatively, the operating or indexing means may be a radial arm or arms secured for movement with the pickup means.

The novel features of the invention include interchangeability of operating means, the hinge construction for the cover, the indexing means, and the construction of the pickup means. The base and cover, including the hinge portions thereof, are especially designed to provide for simple and economical molding thereof from a suitable plastic composition material, and simple assembly of the parts.

For an understanding of the invention principles, reference is made to the following description of typical embodiments thereof as illustrated in the accompanying drawings. In the drawings.

Figure 1:
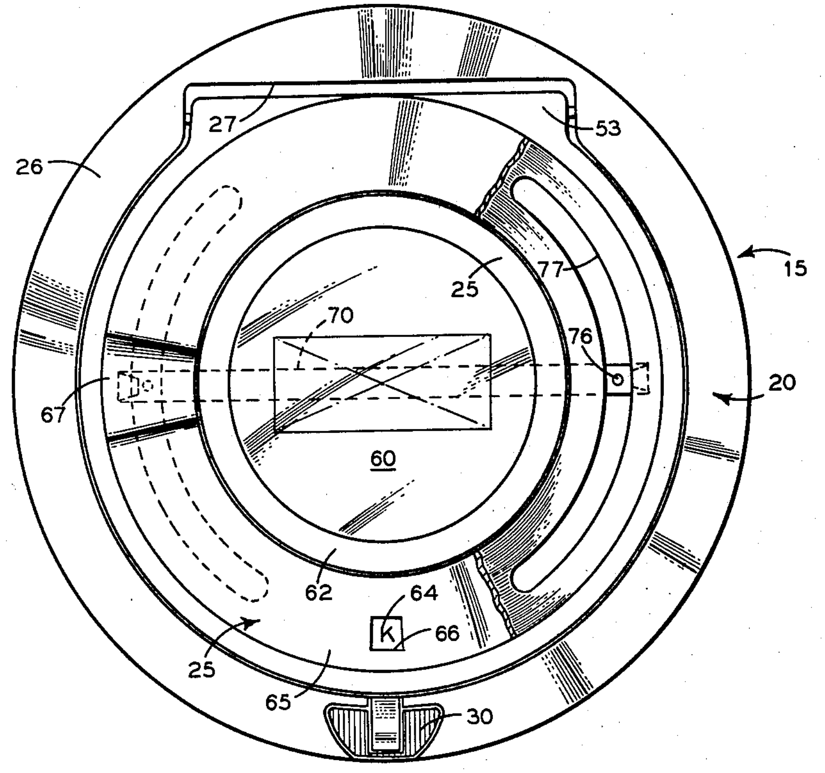
Fig. 1 is a top plan view of a circular card file or memorandum device embodying the invention.
Figure 2:
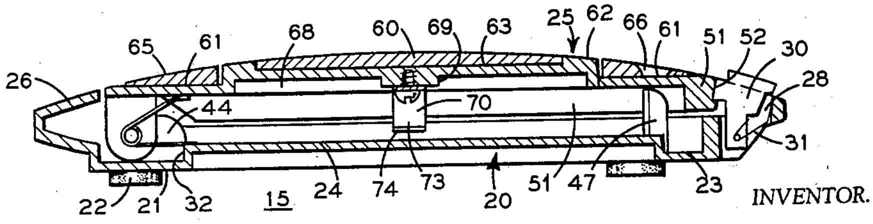
Fig. 2 is a substantially diametric sectional view of the device.
Figure 3:
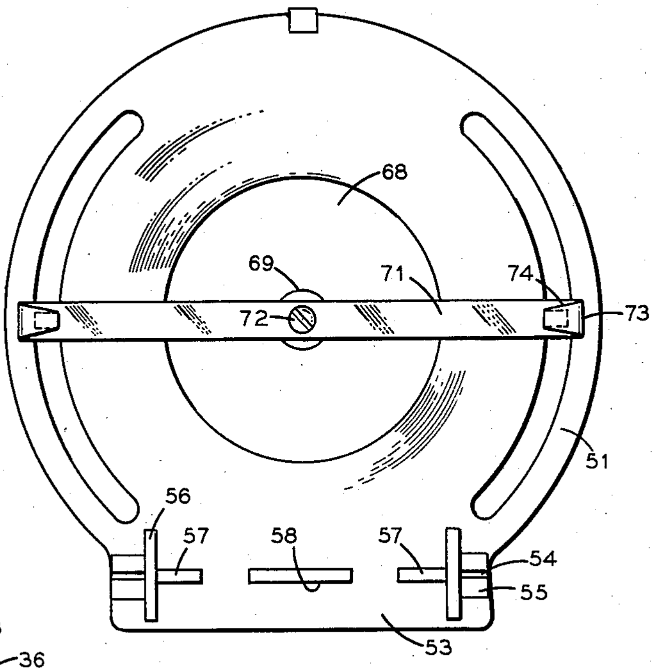
Fig. 3 is an inside view of the cover illustrating one form of pickup means.

Referring to Figs. 1 through 5, the indexed memorandum device or card file 15 therein illustrated comprises a generally circular base 20 and a generally circular cover 25 both preferably molded of a plastic composition material. Device 15 is generally streamline, tapering from a thicker central portion toward a thinner rim portion. Base 20 includes an annular flat surface 21 from which extend support legs or abutments 22. Flat surface 21 forms the base of an annular recess or channel 23 in the upper surface of the base, recess 23 bounding a circular card support surface 24. The upper surface of the rim 26 of base 20 has its inner periphery substantially in alignment with the outer periphery of recess 23.

At the hinge edge of device 15, the inner periphery of rim 26 has a rectangular recess 27, and diametrically opposite recess 27 is an aperture 28 in which is oscillatably mounted a latch 30. A spring 31 biases latch 30 to the latching position. Surface 24 has a chordal edge 32 parallel to the base of recess 27, thus forming a substantially rectangular surface for the hinging elements 35.

Figure 5:
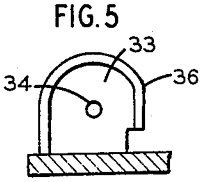
Fig. 5 is an elevation view of a hinge member molded of plastic composition material.
Figure 4:
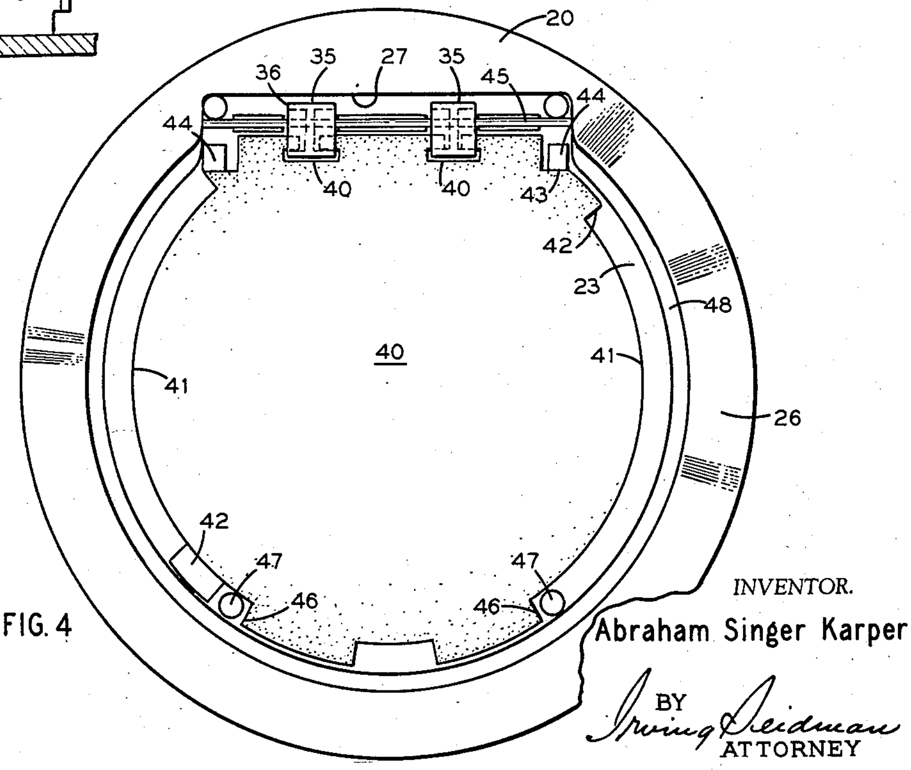
Fig. 4 is a plan view of the base, with the cover removed, illustrating the stacked cards.

Referring to Fig. 5, each hinging element comprises an upright plate or disk 33 having an aperture 34 and a periphery which is arcuate over the upper edge of plate 33. A flat flange or rim 36 extends along the periphery of plate 33, forming the head of a T engageable in a T-shape slot in the rear edge of index cards 40.

Cards 40 have opposite concentric arcuate peripheral portions 41 forming the bases of peripheral notches in the cards. The notches in the card of Fig. 4 terminate at shoulders 42. The shoulders of adjacent cards are progressively offset peripherally of the cards. At their hinge ends, cards 40 have shoulders 43 engaging posts 44 on base 20, these posts having curved card-engaging surfaces concentric with the hinge axis. The free ends of cards 40 have shoulders 46 engaging posts 47 in recess 23.

Cover 25 has a relatively thick dependent rim 51 extending through the major portion of its periphery. Rim 51 is notched, as at 52, for cooperation with latch 30. Rim 51 is arranged to seat on ledge 48 of base 20 when cover 25 is closed. The hinge edge of cover 25 has a projection 53 generally conforming to recess 27. At each edge, projection 53 has integrally molded therewith a cylindrical lug 55 with a radial slot 54 therein. At the inner edge of each lug 55 there is molded integrally with the cover and lug an apertured flange ring 56. Ribs 57 extend inwardly from rings 56 with their ends spaced from a central rib 58 by the width of members 40.

When cover 25 is assembled to base 20, rings 56 engage the inner edges of posts 44, and members 35 fit between ribs 56 and 57. The posts are held assembled by hinge pin 45 inserted through elements 35, 55 and 56. Spring 50 biases cover 25 to the open position when latch 30 is operated.

Inwardly of rim 51, cover 25 has a flat annular bearing surface 61 whose inner periphery is defined by a raised circular center portion 62 having a central circular depression 63 arranged to receive a disk 60 carrying advertising matter on a calendar. Surface 61 is a bearing surface for an annular indexing member or ring 65 having an aperture 66 to expose indicia 64 on surface 61. Ring 65 has finger depressions 67 in its upper surface for easy operation of the ring.

The undersurface of the cover has a shallow recess 68 a little larger than recess 63, and at the center of this recess is an abutment 69 for pivotally mounting card pickup means 70. Pickup means 70 comprises radial arms 71 extending from screw or stud 72 connecting means 70 to abutment 69. The outer ends of arms 71 are bent downwardly, as at 73, and inwardly, as at 74. Bent ends 74 ride in recess 23 beneath cards 40. Pickup means 70 is rotated by ring 65 through the medium of connections 76 extending through arcuate slots 77 in surface 61.

Normally, when cover 25 opens, ends 74 of arms 71 extend in the notches of cards 40 and thus pickup only those cards having shoulder portions 42 overlying ends 74. Thus, a selected number of cards is picked up when the cover opens, the number depending on the relation of window 66 to indicia 64. Thereby, a selected top card of the stack in base 20 is exposed when the cover is open.

Figure 6:
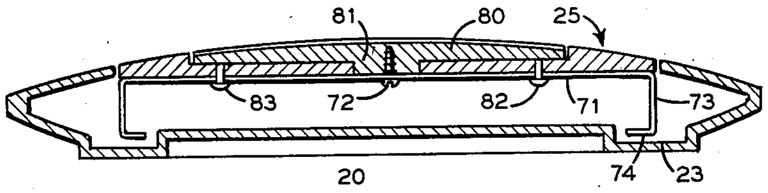
Fig. 6 is a substantially diametric sectional view, at right angles to Fig. 2, and illustrating a modified form of cover.

In Fig. 6, ring 65 is replaced by a central operating disk 80 having a hub 81 secured to pickup means 70 and also connected to the latter by means 82 extending through arcuate slots 83 in cover 25.

Figure 7:
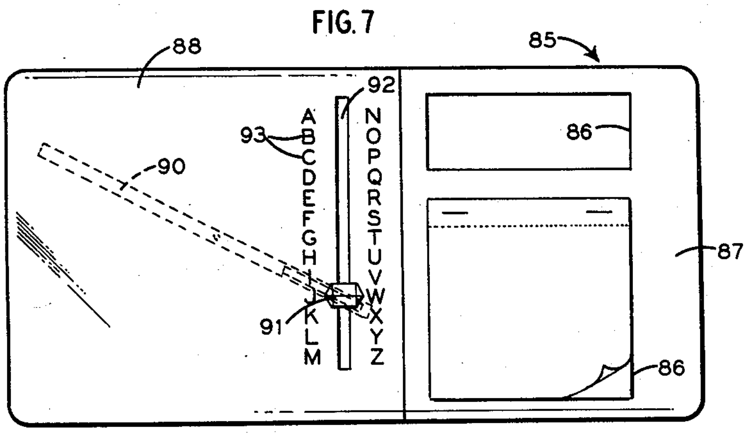
Fig. 7 is a plan view illustrating the invention as embodied in a substantially rectangular card file having accesory features on the cover.

Fig. 7 illustrates an alternative construction in which the memorandum device 85 is generally rectangular and has recess 86 in a fixed cover 87 on the base. The pickup means 90 is substantially similar to means 70 and is pivoted to movable cover 88. One radial arm is slotted to slidably receive an operating knob 91 movable along a slot 92 in cover 88 for cooperation with indicia 93 along the sides of slot 92. Accesses or wells 86 may receive a pad, paper clips, or the like. The card pickup operates in the same manner as described.

Figure 8:
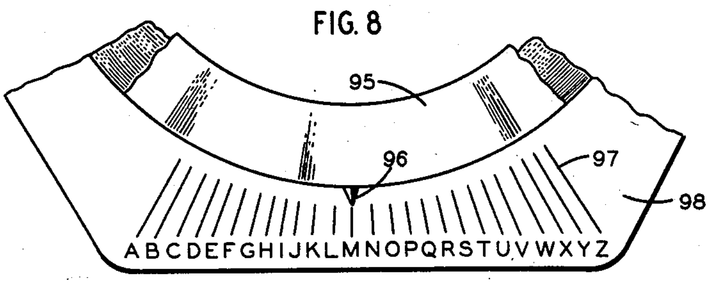
Fig. 8 is a partial plan view illustrating a modified indexing means.

In the embodiment of Fig. 8, the indexing or operating member, such as ring 95, has a pointer 96 cooperable with an index scale 97 on the base 98 of the device, cover 99 being spring biased to the open position as described.

While specific embodiments of the invention have been shown and described in detail to illustrate the application of the invention principles, it will be understood that the invention may be embodied otherwise without departing from such principles.

What is claimed is:

1. An indexed memorandum device for a stack of memorandum cards each having opposed concentric arcuate peripheral portions each having a notch therein with the two notches of each card being located in relatively corresponding positions, the notches of adjacent cards, from the uppermost card toward the lowermost card, being progressively extended stepwise along the peripheral portions in the same direction; said device comprising, in combination; a housing of molded composition material arranged to contain the cards and including a base portion, and a rim portion surrounding said base portion and defining an opening, and extending first outwardly and upwardly, then upwardly, and then inwardly and upwardly from said base portion; said rim portion providing a streamline contour to said housing; a cover of molded composition material arranged to close said opening; spring means enclosed by said housing and cover, biasing said cover to the open position; releasable latch means on said housing engageable with said cover; pick up means pivotally secured to the inner surface of said cover for movement about an axis common to that of said peripheral portions and including a pair of radial arms extending outwardly toward each of said peripheral portions and having ends bent toward said base and then radially inwardly to form hooks engageable with said cards, the hooks fitting freely through notches in the cards radially aligned with said arms; indicia carried on the outer surface of said cover; an operator movably mounted on the outer surface of said cover and cooperable with said index; a slot in said cover; and connecting means movable in said slot and connecting said pickup means to said operator for movement thereby to position said pick up means to engage a selected number of said cards to lift the same with said cover, when said latch means is released, to expose the uppermost of the cards remaining in said base; said opening and cover being circular, said operating member being a ring oscillatable on said cover, and said cover having a pair of arcuate slots aligned with said ring.

2. An indexed memorandum device as claimed in claim 1 in which said opening and cover are circular, said operating member is a ring oscillatable on said cover, said cover has a pair of arcuate slots aligned with said ring, and said cover has a central circular recess; and a circular disk conformingly seated in said recess and adapted to have information imprinted thereon.

3. An indexed memorandum device as claimed in claim 1 in which said opening and cover are circular, said operating member is a ring oscillatable on said cover, said cover has a pair of arcuate slots aligned with said ring, and the indicia are imprinted on the cover and selectively exposed through an opening in said ring.

References Cited in the file of this patent

UNITED STATES PATENTS

| | | |
|---|---|---|
| 2,141,761 | Pollock | Dec. 27, 1938 |
| 2,223,966 | Peters et al. | Dec. 3, 1940 |
| 2,541,903 | Ajero | Feb. 13, 1951 |
| 2,556,734 | Nein | June 12, 1951 |